(12) United States Patent
Walker

(10) Patent No.: US 11,710,273 B2
(45) Date of Patent: Jul. 25, 2023

(54) IMAGE PROCESSING

(71) Applicant: Sony Interactive Entertainment Inc., Tokyo (JP)

(72) Inventor: Andrew William Walker, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 246 days.

(21) Appl. No.: 16/877,615

(22) Filed: May 19, 2020

(65) Prior Publication Data

US 2020/0372671 A1    Nov. 26, 2020

(30) Foreign Application Priority Data

May 22, 2019 (GB) .................................... 1907202

(51) Int. Cl.
| | |
|---|---|
| *G06T 7/73* | (2017.01) |
| *G06T 7/55* | (2017.01) |
| *H04N 13/271* | (2018.01) |
| *H04N 13/282* | (2018.01) |
| *H04N 13/00* | (2018.01) |

(52) U.S. Cl.
CPC ................. *G06T 7/73* (2017.01); *G06T 7/55* (2017.01); *H04N 13/271* (2018.05); *H04N 13/282* (2018.05); *H04N 2013/0081* (2013.01)

(58) Field of Classification Search
CPC .......... G06T 7/73; G06T 7/55; H04N 13/271; H04N 13/282; H04N 2013/0081
See application file for complete search history.

(56) References Cited

U.S. PATENT DOCUMENTS

| | | | | |
|---|---|---|---|---|
| 6,008,798 A | * | 12/1999 | Mato, Jr. ............... | G06F 3/0423 345/175 |
| 8,462,199 B2 | * | 6/2013 | Givon .................. | H04N 13/257 348/40 |

(Continued)

FOREIGN PATENT DOCUMENTS

EP          3742396 A1     11/2020

OTHER PUBLICATIONS

Combined Search and Examination Report for corresponding GB Application No. GB1907202.4 2 pages, dated Oct. 31, 2019.

(Continued)

*Primary Examiner* — Brian P Yenke
(74) *Attorney, Agent, or Firm* — Matthew B. Dernier, Esq.

(57) ABSTRACT

Apparatus comprises a camera configured to capture images of a user in a scene; a depth detector configured to capture depth representations of the scene, the depth detector comprising an emitter configured to emit a non-visible signal; a mirror arranged to reflect at least some of the non-visible signal emitted by the emitter to one or more features within the scene that would otherwise be occluded by the user and to reflect light from the one or more features to the camera; a pose detector configured to detect a position and orientation of the mirror relative to at least one of the camera and depth detector; and a scene generator configured to generate a three-dimensional representation of the scene in dependence on the images captured by the camera and the depth representations captured by the depth detector and the pose of the mirror detected by the pose detector.

8 Claims, 11 Drawing Sheets

(56) References Cited

U.S. PATENT DOCUMENTS

| | | | | |
|---|---|---|---|---|
| 8,994,792 | B2* | 3/2015 | Chen | H04N 13/178 |
| | | | | 348/46 |
| 9,204,121 | B1* | 12/2015 | Marason | H04N 13/271 |
| 9,225,916 | B2* | 12/2015 | Friel | H04N 5/332 |
| 9,277,206 | B1 | 3/2016 | Lloyd | |
| 9,983,692 | B2* | 5/2018 | Mallinson | G09G 3/346 |
| 10,061,409 | B2* | 8/2018 | Usami | G02B 27/017 |
| 11,010,958 | B2* | 5/2021 | Bickerstaff | G06T 15/205 |
| 11,232,625 | B2* | 1/2022 | Leonardi | G06T 15/08 |
| 11,328,488 | B2* | 5/2022 | Williams | G06N 20/00 |
| 11,501,486 | B2* | 11/2022 | Williams | G01B 11/303 |
| 11,568,893 | B2* | 1/2023 | Connor | H04N 21/8547 |
| 2008/0185526 | A1* | 8/2008 | Horak | G01J 5/084 |
| | | | | 250/353 |
| 2012/0194650 | A1 | 8/2012 | Izadi | |
| 2013/0321790 | A1* | 12/2013 | Kirby | G01P 3/36 |
| | | | | 356/3.14 |
| 2014/0118509 | A1* | 5/2014 | Kroon | H04N 13/111 |
| | | | | 348/51 |
| 2016/0368422 | A1* | 12/2016 | Uppal | B60R 1/08 |
| 2017/0302849 | A1* | 10/2017 | Muschaweck | G02B 26/0825 |
| 2017/0365068 | A1 | 12/2017 | Tan | |
| 2018/0025505 | A1* | 1/2018 | Huang | H04N 13/271 |
| | | | | 382/154 |
| 2018/0268601 | A1* | 9/2018 | Rad | G06K 9/6256 |
| 2019/0020850 | A1* | 1/2019 | Meyers | H04N 5/772 |
| 2019/0377191 | A1* | 12/2019 | Hughes | G02B 27/0176 |
| 2020/0089015 | A1* | 3/2020 | Reichow | G03B 21/56 |
| 2020/0234495 | A1* | 7/2020 | Nakao | G06T 15/20 |
| 2020/0285309 | A1* | 9/2020 | Mccombe | G06F 3/013 |
| 2020/0372685 | A1* | 11/2020 | Sanders | G06T 9/001 |
| 2020/0372933 | A1* | 11/2020 | Connor | G11B 27/10 |
| 2020/0387739 | A1* | 12/2020 | Williams | G06T 5/002 |
| 2020/0393545 | A1* | 12/2020 | Shani | G01S 17/894 |
| 2020/0410767 | A1* | 12/2020 | Williams | H04N 23/60 |
| 2021/0012554 | A1* | 1/2021 | Leonardi | G06T 9/00 |
| 2021/0035354 | A1* | 2/2021 | Williams | G06T 15/50 |
| 2021/0041693 | A1* | 2/2021 | Mamishin | G02B 27/0093 |
| 2021/0065432 | A1* | 3/2021 | Bickerstaff | H04N 13/271 |
| 2021/0392297 | A1* | 12/2021 | Liu | G06V 20/597 |
| 2021/0392318 | A1* | 12/2021 | Cappello | G02B 27/0093 |
| 2021/0400249 | A1* | 12/2021 | Edmonds | G06T 7/40 |
| 2022/0179083 | A1* | 6/2022 | Wolke | G01S 17/89 |
| 2023/0117567 | A1* | 4/2023 | Uberti | G06V 10/764 |
| | | | | 382/103 |
| 2023/0122636 | A1* | 4/2023 | Breugelmans | G06T 7/74 |
| | | | | 382/154 |

OTHER PUBLICATIONS

Y Furukawa, et al., "Multi-View Stereo: a Tutorial" Foundations and Trends in Computer Graphics and Vision, Now Publishers Inc., vol. 9, No. 1-2, 40 pages, (Jan. 2013).

Examination Report for corresponding GB Application No. 1907202. 4, 4 pages, dated Aug. 9, 2021.

Extended European Search Report for corresponding EP Application No. 20170637.1, 11 pages, dated Oct. 19, 2020.

Tanwi Mallick et al., "Omni-directional Reconstruction of Human Figures from Depth Data using Mirrors" Proceedings of the 10th International Conference on Computer Vision Theory and Applications, pp. 559-566, Jan. 1, 2015.

Chan S. W. et al., "Periscopic Stereo for Virtual World Creation" Image processing and Its Applications, Sixth International Conference, pp., 419-422, Jul. 14, 1997.

Akay Abdullah et al., "3D Reconstruction with Mirrors and RGB-D Cameras" 2014 International Conference on Computer Vision Theory and Applications, 10 pages, Jan. 5, 2014.

Ki Jung, et al., "3D Reconstruction using Moving Planar Mirror" Proceedings of the 6th IASTED International Conference Computer Graphics and Imaging, pp. 129-134, Aug. 13-15, 2003.

Communication Pursuant to Article 94(3) for corresponding EP Application No 20170637.1, 7 pages, dated Jul. 14, 2022.

\* cited by examiner

IMAGE PROCESSING

BACKGROUND

Field of the Disclosure

This disclosure relates to image processing systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In recent years, driven at least in part by the improvements made in display technology, there has been an increase in the demand for interactive content that is able to offer an immersive experience to a user. For example, the increase in the number and quality of virtual reality (VR) and augmented reality (AR) devices lends itself to the provision of immersive experiences, while the development of televisions and other display devices that offer increased resolution, refresh rate, and colour reproduction (for example) also act as increasingly suitable devices for the provision of such content. In addition to this, advances in computing and graphics technology have contributed to the increase in suitable content that may be made available.

While video games may be provided that can offer such an experience, the approaches taken to provide immersion in video games may not be applicable to captured video content such as movies or sports events. For example, when generating video game content it is common that the locations and properties of all objects in the environment are known and other features, such as lighting information, are also able to be calculated. Such information is often not available for captured video content, and therefore techniques applicable to video games to enable the provision of more immersive content are not considered to be widely applicable.

One example of captured video content that is adapted for increased immersion of a user is that of three-dimensional video. Consumer devices are available that are operable to display content that may be viewed (often aided by a corresponding set of glasses that are configured to enable the viewing of three-dimensional content) in a manner that causes the user to perceive the content as having significant depth despite the use of a two-dimensional display.

However, one drawback with such systems is that the viewpoint that is adopted by the user is often pre-defined (such as tied to the camera position in a movie) or severely limited (such as allowing a user to switch between a number of such pre-defined viewpoints).

This may serve to reduce the level of immersion that is experienced by the user when viewing the content, particularly in a VR context, as despite appearing three-dimensional there is no corresponding motion of the viewpoint as the user moves their head as would be expected were the user to move their head when viewing real-world content. The resulting disconnect between the viewpoint and the user's motion can lead to a sense of discomfort for the user, in addition to the loss of immersion.

Similarly, the restrictions placed upon the viewpoint location may be made more noticeable when a user is provided with more immersive content, as the user may be more inclined to try and explore the displayed environment. This can lead to the user attempting to relocate the viewpoint to a desired location in the virtual environment, and becoming frustrated when such a relocation is not possible within the constraints of the provided content. Examples of such changes in viewpoints include a user moving their head in a VR system in order to look around an environment, or an input using a controller or the like in a two-dimensional display arrangement.

It is in view of the above considerations that so-called free viewpoint systems have been developed. The object of such systems is to provide content which a user is able to navigate freely, such that a viewpoint may be selected freely (or at least substantially so) within a virtual environment and a corresponding view is able to be provided to a user. This can enable a user to navigate between any number of viewpoints within the virtual environment, and/or for multiple users to occupy corresponding preferred viewpoints within the virtual environment. These viewpoints may be distributed about an environment in a discreet fashion, or the changing of viewpoints may be a result of a continuous motion within the environment, or content may incorporate elements of each of these.

A number of challenges exist when seeking to provide high-quality image or video content with a free viewpoint. A number of such problems derive from the limitations of the content capturing systems that are used; for example, it may be difficult to capture sufficient image information due to occlusions, image resolution, and camera calibration or the like. In addition to this, information that may be required to generate additional viewpoints (such as lighting information, depth information, and/or information about occluded objects) may be difficult to derive based upon the captured image information. Similarly, limitations of the image capturing arrangement may lead to noisy data being obtained due to a lack of precision; such data may not be suitable for reproduction.

While a number of the problems associated with these issues can be mitigated by the inclusion of a greater number of cameras (or other sensors), this can be rather impractical in many cases. Similarly, addressing these issues by simply increasing the amount of processing that is applied can also be problematic, particularly when live content is being provided. It is therefore considered that alternative modifications to the free viewpoint content generating may be advantageous.

It is in the context of the above problems that the present disclosure arises.

SUMMARY

The present disclosure provides apparatus comprising:
a camera configured to capture images of a user in a scene;
a depth detector configured to capture depth representations of the scene, the depth detector comprising an emitter configured to emit a non-visible signal;
a mirror arranged to reflect at least some of the non-visible signal emitted by the emitter to one or more features within the scene that would otherwise be occluded by the user and to reflect light from the one or more features to the camera;
a pose detector configured to detect a position and orientation of the mirror relative to at least one of the camera and depth detector; and
a scene generator configured to generate a three-dimensional representation of the scene in dependence on the images captured by the camera and the depth representations captured by the depth detector and the pose of the mirror detected by the pose detector.

The present disclosure also provides a method comprising:

capturing images of a user in a scene;

capturing depth representations of the scene, including emitting a non-visible signal;

providing a mirror arranged to reflect at least some of the non-visible signal emitted by the emitter to one or more features within the scene that would otherwise be occluded by the user and to reflect light from the one or more features for the step of capturing images;

detecting a position and orientation of the mirror; and generating a three-dimensional representation of the scene in dependence on the captured images and depth representations and the detected pose of the mirror.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A number of different approaches for implementing free viewpoint content are considered to be suitable, including photogrammetric, light field/multiscopic, and volumetric approaches. Of course, a number of other approaches (or combinations of the above) may be considered.

The first of these approaches comprises the manipulation of captured images in order to appear three-dimensional; this can add freedom to the viewpoint by enabling the user to peer 'around' an object in the image—this can often be rather limited in scope, but is suitable for a number of purposes. Reprojection of the captured image is often used in methods following this approach, enabling the simulation of the 'correct' view (that is, a view that appears to be from the correct position).

The second approach relies on the capturing of a number of images of the environment from different locations. A free viewpoint experience may then be provided to the user by using interpolation between the captured images; the user is able to manipulate the viewpoint freely within the bounds of the image capture area (that is, the area or volume bounded by the image capture devices).

The third approach that is considered, which is the approach in the context of which the present application is provided, comprises the generation of a virtual scene representing the imaged volume in the content capture process. This may include identifying the geometry of the volume and the objects within it, as well as determining any other parameters (such as lighting effects) as appropriate. Such an approach is discussed in 'Multi-View Stereo: A Tutorial' (Y Furukawa, C Hernández, Foundations and Trends in Computer Graphics and Vision, Vol 9, No. 1-2, 2013).

While the present application is framed within the context of the volumetric approach to free viewpoint content, it is considered that the techniques discussed within may be applicable to one or more other approaches.

Figure 1:
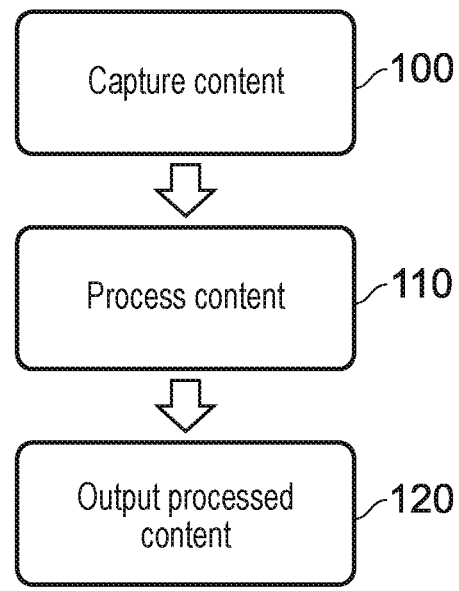
FIG. 1 schematically illustrates a free viewpoint generation and output method.

FIG. 1 schematically illustrates a method for capturing and generating free viewpoint content, in line with the third approach described above.

A step 100 comprises capturing the content. The content capturing process includes the use of image sensors, such as cameras, and may further include the use of microphones or the like for capturing audio. While in some cases the captured image content may be entirely two-dimensional, in other cases the content capturing process includes the capturing of depth information for a scene—this can be achieved using stereoscopic or depth cameras/detectors, for example, or any other method for determining the distance to an object in the capture environment. Examples of content capturing arrangements are described below with reference to FIGS. 2 and 3.

A step 110 comprises performing processing on the captured content, with the aim of generating content that a user is able to use to explore the captured environment with the aid of a free viewpoint. Examples of processing include the estimating of the depth of objects within the captured images, and the encoding of the processed data into a suitable format for storage and/or output to a viewer. Each of these is discussed below with reference to FIG. 5.

The processed data comprises a three-dimensional representation of the environment for which the content capture is performed (or is sufficiently complete so as to enable the generation of such a representation). This representation may be able to be distributed to a user to enable them to generate free viewpoint experiences locally, or it may be able to be used (for example, at a server) to generate image frames in accordance with a viewpoint defined by a client device.

A step 120 comprises the output of the free viewpoint content to a viewer. This may be performed in a number of different ways; for example, the viewer may request a particular viewpoint from a server which holds the encoded data. The server may then generate images representing the viewpoint at the requested position, and transmit this to the viewer. In some embodiments, the viewer may instead be provided with encoded data for the whole (or at least a part of) the captured environment such that processing for generating image content is performed locally.

Figure 2:
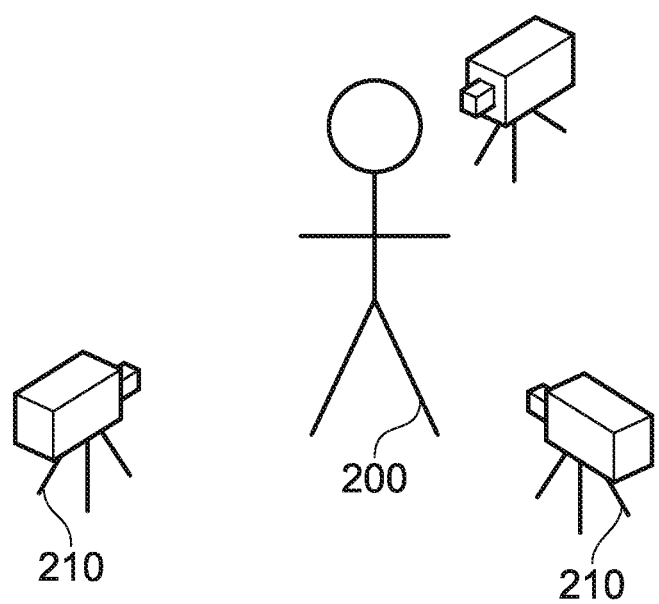
FIG. 2 schematically illustrates a content capture arrangement.

FIG. 2 schematically illustrates a content capture arrangement that may be used to implement step 100 as described with reference to FIG. 1.

In this Figure, a plurality of cameras 210 are arranged so as to capture images of a person 200 (such as an actor in a movie) from a range of different angles. The cameras 210 may also be configured to capture audio in the environment, although this may instead be captured separately. In some embodiments it is advantageous to be able to synchronise the cameras or establish the timing offset between their image capture—this may assist with generating a high-quality output for a user.

Between them, the cameras 210 may be arranged so as to be able to capture images of a significant proportion of the environment and objects within the environment. In an ideal scenario every part of every surface within the environment is imaged by the arrangement of cameras, although in practice this is rarely possible due to factors such as occlusions by other objects in the environment. Such an issue may be addressed in a number of manners, a selection of which are discussed below.

For example, the arrangement of cameras 210 as shown in FIG. 2 may be suitable for capturing images of the user from a number of angles—but the side of the person 200 facing away from the cameras may not be well-imaged, leading to a lack of information for this area. A number of techniques may be used to mitigate this problem, some of which will be discussed below.

Figure 3:
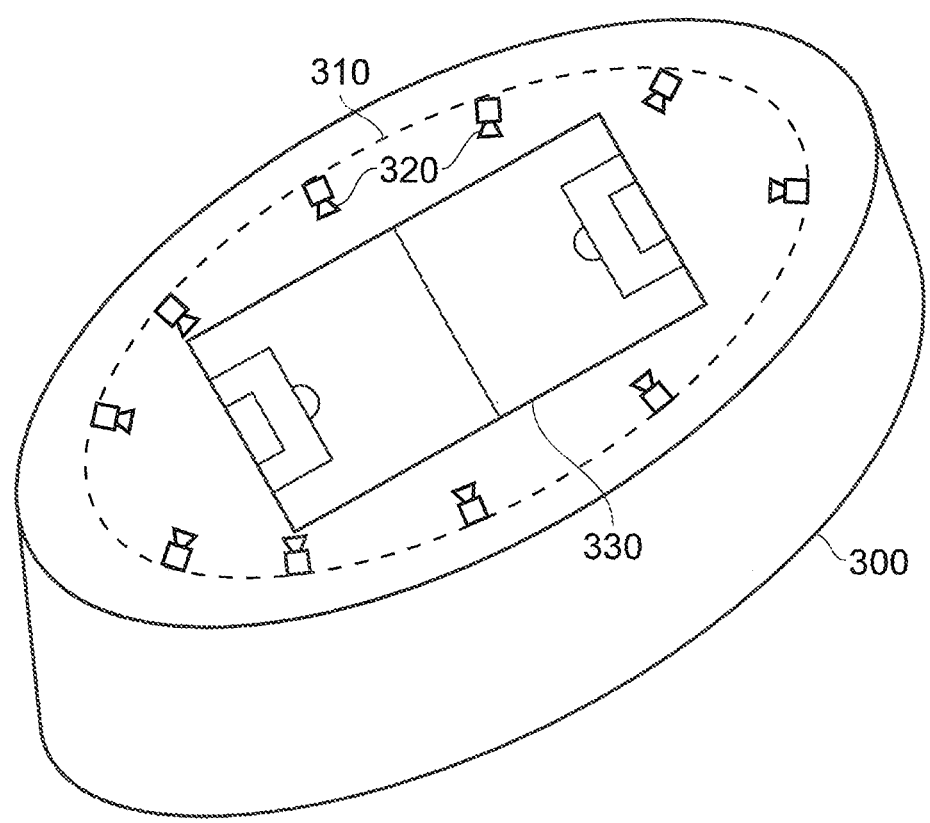
FIG. 3 schematically illustrates an alternative content capture arrangement.

FIG. 3 schematically illustrates an alternative content capture arrangement that may be used to implement step 100 as described with reference to FIG. 1. As is apparent from FIG. 3, this is a configuration that may be more suited for the capturing of large-scale events, such as sports matches, rather than individual people—although of course such an arrangement could be scaled down to an environment smaller than a sports stadium as appropriate.

FIG. 3 comprises a stadium 300 which has a fixture 310 that substantially follows the shape of the stadium 300. A plurality of cameras 320 are supplied on this fixture 310, and may be angled so as to capture images of events within the stadium 300; this may include the action on the pitch 330, the sidelines, or even the crowd. The number of cameras, and the properties of each camera, may be selected freely in order to provide a suitable degree of optical coverage of the environment. For example, a set of 40 cameras each with 4K resolution and arranged so as to be able to collectively image the whole pitch 330 may be provided.

Figure 4A:
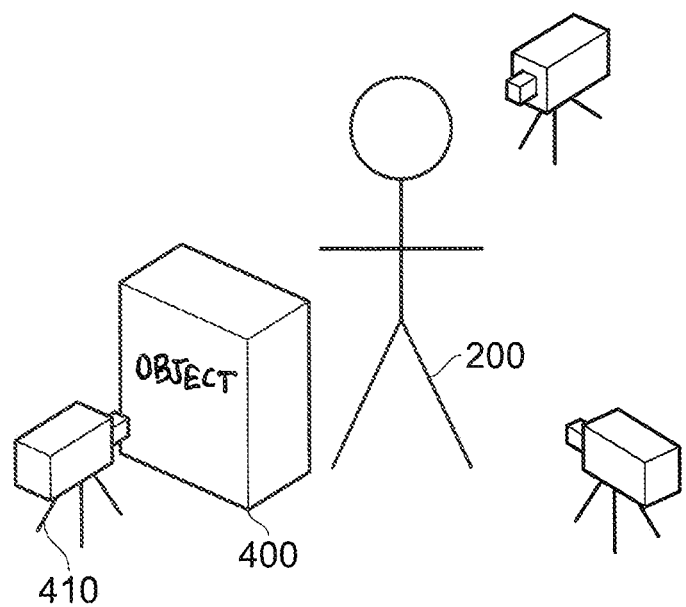
FIGS. 4a and 4b schematically illustrate an occluded content capture arrangement.
Figure 4B:
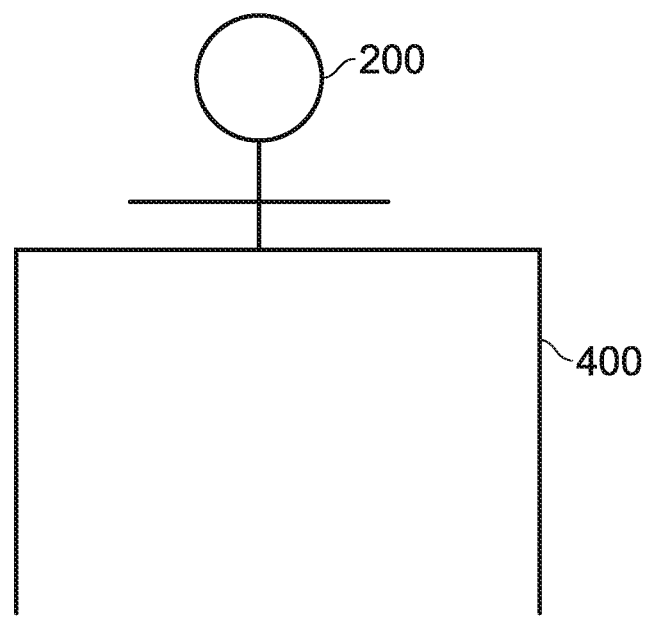

FIGS. 4a and 4b schematically illustrate an occlusion problem that may arise when capturing content in line with step 100 of FIG. 1.

FIG. 4a schematically illustrates an occluded content capture arrangement; this is the content capture arrangement of FIG. 2, with an additional object 400 in the capture environment that prevent the camera 410 from correctly imaging the person 200. Of course, while shown as an inanimate object the object 400 could be anything that blocks the camera's view—such as other people, cameras, or even inclement weather.

FIG. 4b schematically illustrates a viewpoint from the camera 410 of FIG. 4a. It is apparent from this Figure that the camera is no longer able to capture images of the lower half of the person's 200 body due to the occlusion by the object 400. This may lead to incomplete information about this area of the environment, which can cause problems in a free viewpoint arrangement—if a user moves the viewpoint to the other side of the object 400 there would not be sufficient information to generate a view of the person 200.

In some cases, the camera system for capturing images of the environment may be robust to such occlusions—for example, given enough cameras it is possible that the arrangement leads to every part of the environment (or at least a sufficient number of parts of the environment) being imaged by more than one camera. In such a case, it is possible that images of an area occluded from one camera's view are captured by another camera.

Alternatively, or in addition, a number of processing techniques may be used to fill such gaps. For instance, information about that area (such as the colour of the trousers worn by the person 200) may be stored from previously captured frames, or determined in dependence upon other information—for example, it may be assumed that the colour is constant (either over time, spatially, or both), and so any image of the trousers may be enough to supply the colour information despite being captured at a different time, and/or imaging a different portion of the trousers. Similarly, the colour could be input by an operator or the like.

Figure 5:
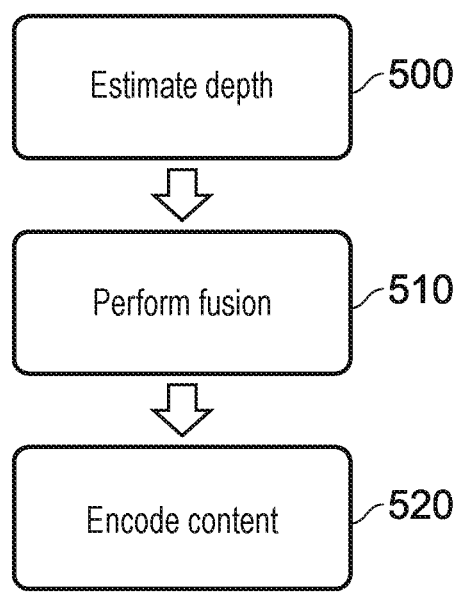
FIG. 5 schematically illustrates a content processing method.

FIG. 5 schematically illustrates a content processing method, which may be implemented as an example of the processing performed in step 110 of FIG. 1. Of course, any suitable processing may be performed in the step 110; it is not limited to that shown in FIG. 5, nor must every step of FIG. 5 be performed.

A step 500 comprises an estimation of the depth of one or more parts of the environment that is imaged. In some cases, this may be performed by identifying the disparity associated with an object between a pair of stereoscopic images; in other cases, monoscopic depth detection may be performed, or a position may be estimated from a number of images based upon knowledge about the position and orientation of the cameras used to capture those images.

A step 510 comprises the fusion of image data. Fusion of image data is the process of combining the information that is obtainable from each of a plurality of images in order to generate a three-dimensional space using images in a two-dimensional space. For example, image data may be fused so as to generate a three-dimensional model of an object that comprises two-dimensional information about each side of the object, as imaged by a corresponding plurality of cameras. This is discussed below in more detail, with reference to FIGS. 6 and 7.

A step 520 comprises the encoding of the processed image data, for example to generate data that is in a format that is suitable for storage and/or transmission to a user. Examples of suitable representations of the content include the use of point clouds and/or meshes to represent objects and features in the environment.

Further processing may also be performed in addition to, or instead of, one or more of the steps shown in FIG. 5. For example, segmentation may be performed so as to determine which elements of a captured image correspond to distinct objects and which elements form the background. Hole-filling or completion processing may also be performed, which is processing that seeks to identify where information about the environment is missing and to approximate information that may be desired, but is not present in the captured information.

As discussed with reference to step 510, fusion of image data may be performed in order to generate a more complete description of the environment in which image capture is performed. For example, image data from a second camera may be used to supplement the image data from a first camera, which can mitigate the problem of occlusion.

In general, fusion techniques utilise a number of captured images that each capture an image (a two-dimensional image and depth information) of the environment, the images being captured at different times or from different camera positions. These images are then processed to extract information to enable a three-dimensional reconstruction or generation.

At a first stage, segmentation is performed. This process results in a separation of an imaged object and a background of the image from one another, such that the background may be removed from the image. The segmented image of the object, in conjunction with the depth data that is captured, can then be used to generate a three-dimensional image of the object from one side, where every pixel of the image represents a point in three-dimensional space.

By generating multiple such images from a number of viewpoints, three-dimensional images may be generated for an object from a number of different sides; this can enable the construction of a full three-dimensional volume representing the external shape of the object. The fusion process here is used to correlate matching points as captured by the different cameras, and to remove any erroneous points, so as to enable a combination of the captured three-dimensional images into a three-dimensional representation.

Figure 6:
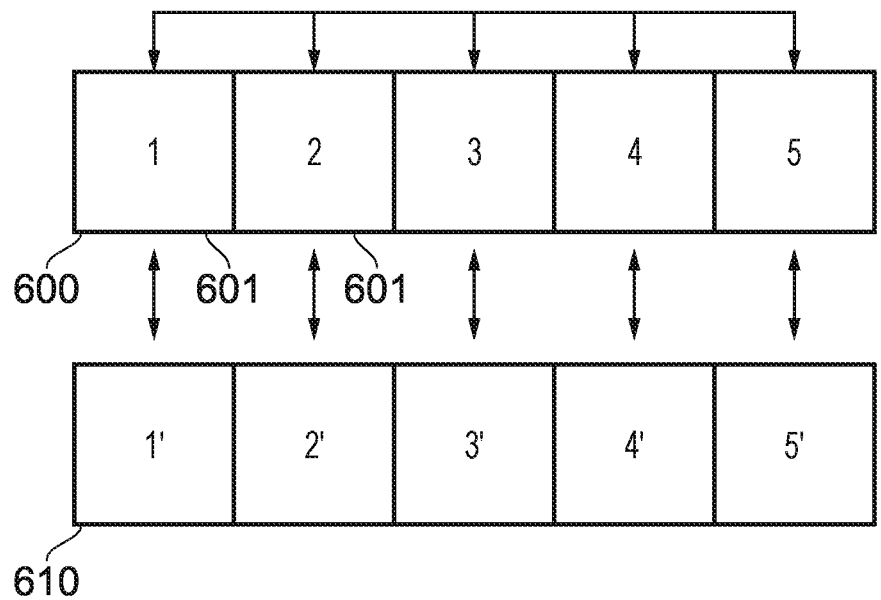
FIG. 6 schematically illustrates image fusion schemes.

FIG. 6 schematically illustrates examples of such fusion. A first image data set 600 and a second image data set 610 are shown, which correspond respectively to image data captured by a first and a second camera. Each of the image data sets comprises a number of consecutive frames 601.

Temporal fusion is a fusion technique that may be performed within a single image data set (that is, an image data set captured by a single camera over a time duration). In FIG. 6, this is shown with respect to the image data set 600, wherein information from the frames 601 (labelled 1-5) may each be used to supplement data from the other frames. Temporal fusion may be advantageous when there is motion of objects within the environment; occlusions may vary between the image frames captured by a single camera, and therefore image data from earlier- or later-captured frames may be suitable to fill gaps (such as those due to occlusion) in the data for a given image frame.

Spatial fusion may be performed between the two image data sets 601 and 610 (that is, image data sets captured by cameras located at different viewpoints); for example, image data from the frame labelled 1' may be used to supplement the image data derived from the frame labelled 1. This may be performed for any pairing of image frames, rather than necessarily being limited to those captured at (at least substantially) the same time. Spatial fusion is advantageous in that the image data from each of the image data sets is obtained from a different position—different views of the same object may therefore be captured.

Figure 7:
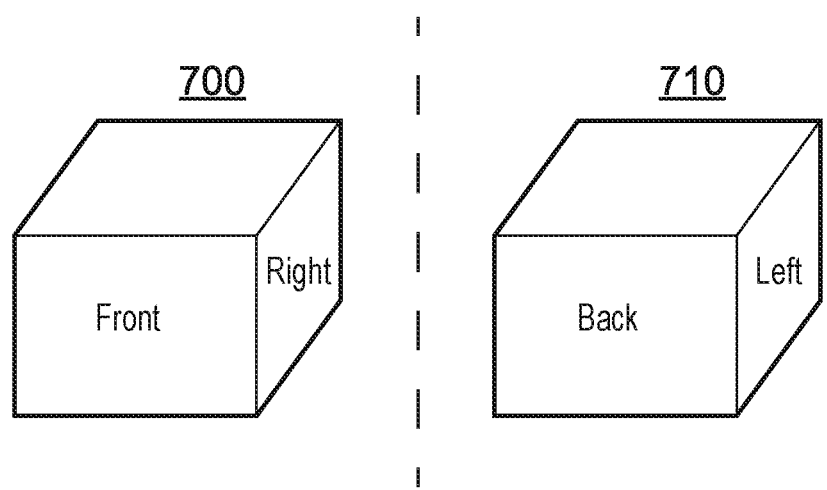
FIG. 7 schematically illustrates image frames for performing image fusion.

FIG. 7 schematically illustrates an example of two image frames 601, each imaging the same object. In the first, labelled 700, the front, top, and right portions of the object can be seen by an image capture device. In the context of FIG. 6, the image 700 may correspond to the image frame labelled 1 in the image data set 600.

In the second, labelled 710, the back, left, and top portions of the object can be seen by an image capture device. In the context of FIG. 6, the image 710 may correspond to the image frame labelled 1' in the image data set 610. This view would therefore represent a view of the object as captured by a different image capture device that is provided at a different location. Alternatively, the image 710 may correspond to the image frame labelled 5 in the image data set 600. This view would therefore represent a view of the object as captured by the same image capture device but at a later time, this time difference being sufficiently long that the object has rotated (or the camera has moved).

In either case, the data from each of the images 700 and 710 may be combined so as to generate a more complete description of the imaged object than would be available using only a single image frame comprising the object. Of course, any suitable combination of spatial and temporal fusion may be used as appropriate—the fusion process should not be limited to the specific examples provided above.

At the conclusion of the method described with reference to FIG. 5 (or an equivalent processing of the captured data), it is anticipated that the captured content has been converted into a form that enables the generation of a viewpoint at any (or at least at a substantial number of) locations within the captured environment.

As noted above, this information may be provided to the user in a raw form including data (such as a point cloud representation of the environment, in addition to texture and lighting information) for the whole of the environment. However, this represents a significant amount of data to transmit and store (point clouds may comprise millions or even billions of data points) and may therefore be inappropriate in a number of scenarios.

As an alternative, this information may be provided to a viewer by generating an image at a server in response to an input viewpoint position/orientation. While this may result in a degree of input latency, it may be responsive enough to provide a suitable free viewpoint experience to a user.

In either case, rendering of a viewpoint must be performed based upon the encoded data. For example, when using a point cloud representation to store information about the captured environment the rendering process comprises a surface reconstruction process as a part of generating an image for display. This is performed so as to enable to generation of surfaces from a set of discrete points in the point cloud.

As a development and variant of the techniques discussed above, FIGS. 8-10 schematically represent an image capture arrangement for use in the generation of a free viewpoint representation (a three-dimensional representation) of a scene. In the example shown in FIGS. 8-10, a laptop-type computer 800 is used as an example of apparatus providing image and depth capture arrangements and data processing functionality, but it is noted that other form factors or physical arrangements could be used providing the same or similar functionality. In other words, the use of a laptop computer is purely an example and other types of image, depth capture and data processing apparatus could be used.

Figure 8:
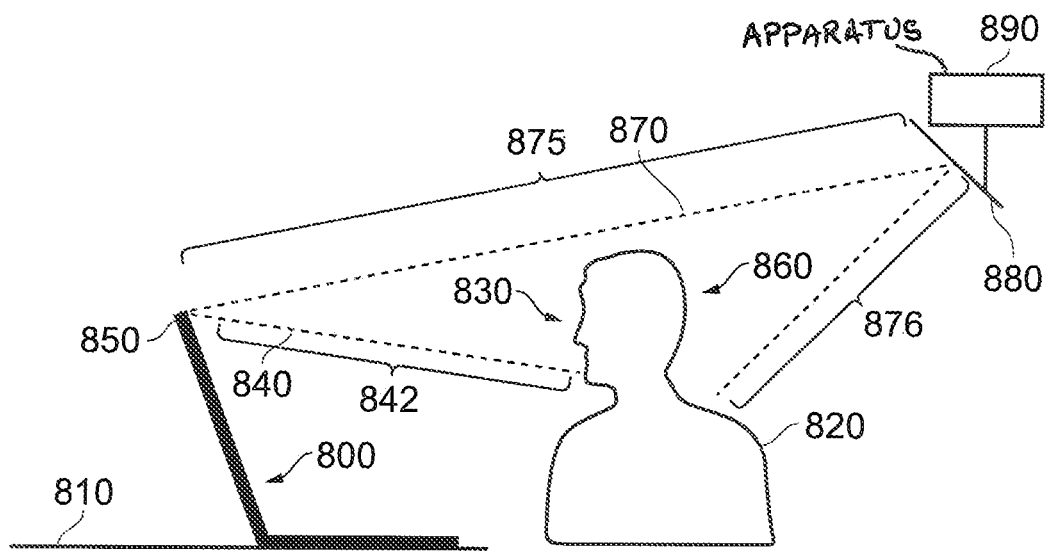
FIGS. 8-10 schematically represent an image capture arrangement.

In FIG. 8, the laptop computer is positioned on a work surface 810, such as a table, and a user 820 is in front of the laptop computer in a position to operate the laptop computer.

Images of a front side 830 of the user 820 can be captured by a direct view 840 from a camera 850 (not shown in FIG. 8 but shown in more detail in FIG. 9 below). However, from the point of view of the location of the camera 850, at least a part of the view of the user 820, for example a rear side 860, is occluded from the direct view 840 of the camera 850.

In example embodiments, images can still be captured of the occluded regions of an object of interest such as the user 820 by an indirect view 870, which is to say a view via a reflective surface or mirror 880. As discussed below, from the direct view 840 and the indirect view 870, a three-dimensional representation of the object of interest, for example the user 820, can be constructed.

The mirror 880 is associated with apparatus 890. Variants of the apparatus 890 will be discussed in more detail below. For example, the apparatus 890 can provide primarily a sensing function so as to allow the data processing functionality of the laptop computer 800 to know the position and/or orientation of the mirror 880. Or the apparatus 890 can provide primarily a positioning function so that, for example under the control of the data processing functionality of the laptop computer 800, the apparatus 890 controls the position and/or orientation of the mirror 880 relative to the camera 850. As mentioned, both of these variants will be discussed further below.

Figure 9:
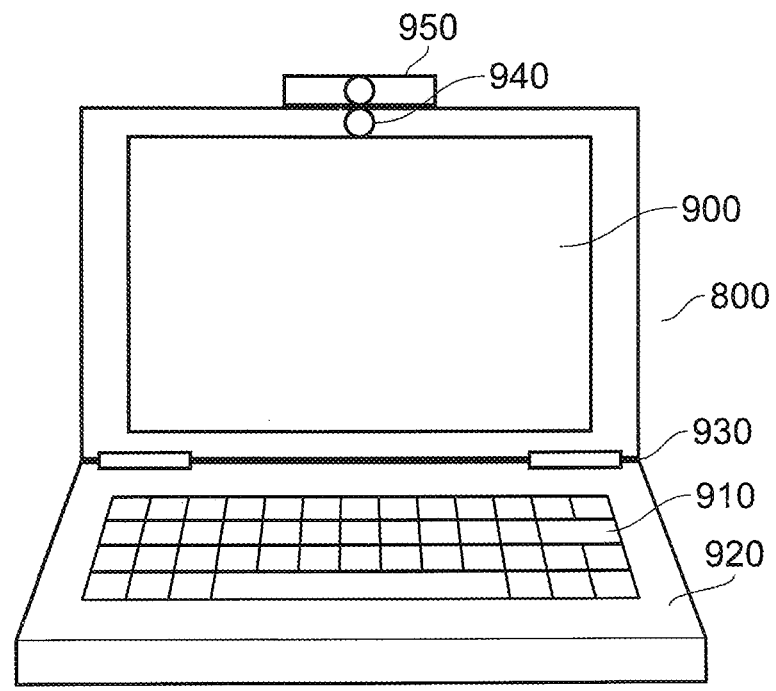

FIG. 9 schematically illustrates the laptop computer 800 having a display screen 900 and a keyboard 910 within a casing 920 hinged at a hinge axis 930.

The camera 850 may be a camera 940 built into the casing 920, or may be a peripheral camera 950 attachable to the casing 920. In the particular examples shown, the camera 850 is provided by the built in camera 940, and the peripheral device 950 in fact represents a depth detector, and in particular a depth detector by which a non-visible signal such as an infra-red signal is emitted by an emitter so that a depth representation of a scene to be captured can be obtained. So, in the examples shown, the device 940 represents a camera to capture images of a scene and the device 950 represents a depth detector configured to capture depth representations of the scene, the depth detector having an emitter configured to emit a non-visible signal.

As shown, in some examples, the camera and at least a non-visible emitter of the depth detector are substantially co-sited.

It will be appreciated that in other examples, neither of the camera and the depth detector may be embodied within the laptop computer 800, or in further different embodiments, both of the camera and the depth detector could be embodied within the casing 920 of the laptop computer 800.

The depth detector may be represented by a so-called LIDAR sensor or the like. A LIDAR sensor, where "LIDAR" signifies "light detection and ranging", and uses emitted light to measure distances from the sensor, based upon a measure of the amount of time it takes for an emitted pulse of light to be reflected back to the LIDAR sensor.

In terms of the direct view 840 in FIG. 8, the camera captures images of the appearance of, for example, the user 820 as an example of an object of interest and the depth detector or in this example LIDAR sensor captures depth representations of those features of the user 820. This allows a three-dimensional representation of at least the front surface 830 of the user 820 to be established for use in a free viewpoint system as discussed earlier.

In terms of the indirect view 870, the range-sensing light (the non-visible signal) emitted by the depth detector is reflected by the mirror 880 onto the rear or occluded surface 860 of the user 820, from which it is reflected back to the mirror 880 and from there back to the depth detector. Similarly, images are captured by the camera 850 of the view formed by reflection in the mirror 880. Therefore, the images of the occluded surface 860 of the user 820 are associated with depth measurements representing a depth equal to the length 875 from the camera 850 to the mirror 880 plus the length 876 of the path from the mirror 880 to the occluded surface 860 of the user 820. Note that the depth detected by the direct view 840 will represent the length 842 of the direct path between the depth detector and the front surface 830 of the user 820.

Figure 10:
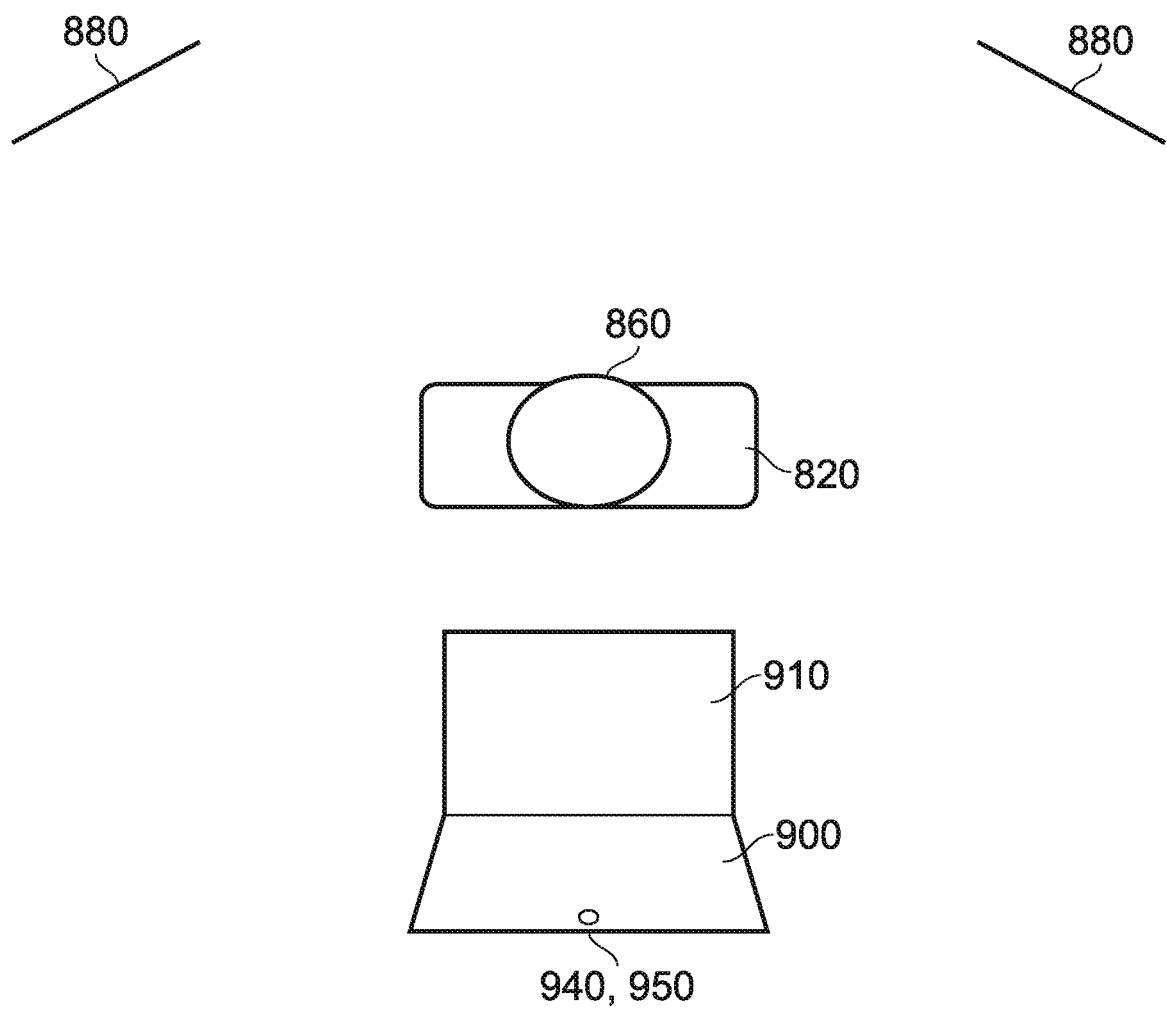

As a comparison of the techniques in FIGS. 8-10 with those of FIGS. 2-4, the indirect view via the mirror 880 takes the place of a rear camera to capture a view otherwise occluded (for example by the user) from the camera 850. Assuming that processing is performed as discussed below to correct for the depth difference of the indirect path 870, the processing to generate the free viewpoint scene can be similar to that discussed above.

In FIG. 10, a plan or overhead view is shown of the example arrangement, in this case illustrating two mirrors 880 providing different indirect viewpoints of the occluded side 860 of the user 820 as seen via the camera 940. Therefore, in examples, the apparatus may comprise two or more mirrors, each having an associated pose detector.

Note that the mirrors 880 are shown in FIGS. 8 and 10 as flat mirrors, but in other examples non-flat mirrors may be used, such as convex or concave mirrors. In some examples, a flexible mirror may be used in association with an actuator configured to vary the bending of the flexible mirror so as to provide a controllable degree of convex or concave operation.

Figure 11:
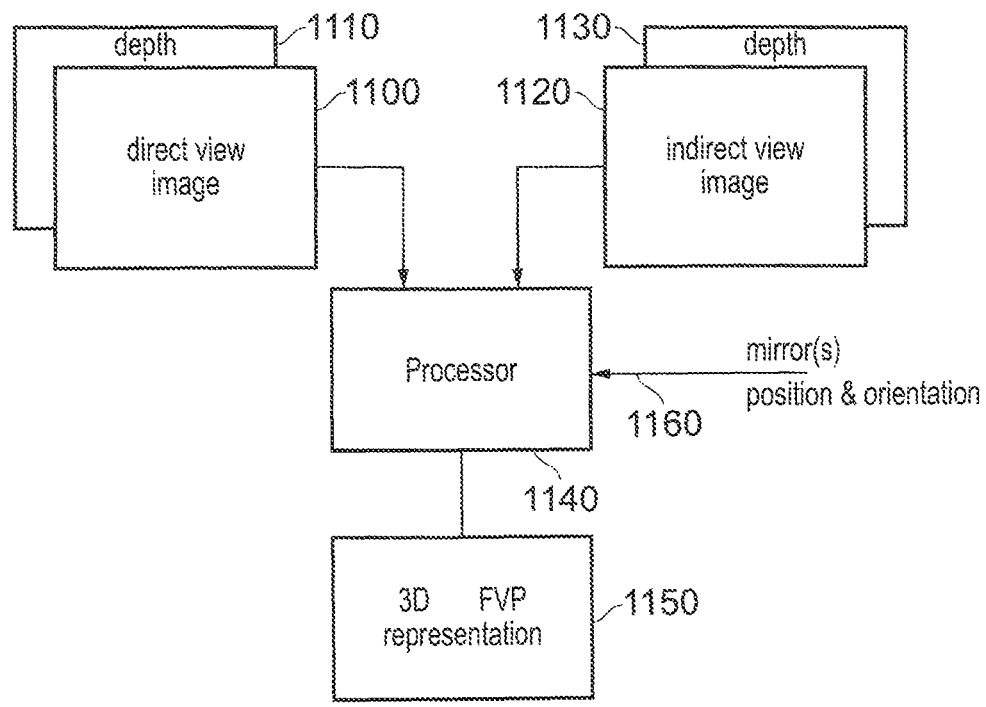
FIG. 11 schematically illustrates a representation construction operation.

FIG. 11 schematically illustrates a representation construction operation in which images 1100 and depth representations 1110 for the direct view are combined with images 1120 and depth representations 1130 for the one or more indirect views via the one or more mirrors 880 by a processor 1140. This leads to the generation of a three-dimensional free viewpoint representation or scene 1150.

In order to combine the images, the processor 1140 has access to information 1160 indicating a current position and/or orientation of each of the mirrors 880. From this, the processor establishes features such as: the angle of view provided by the indirect path 870 (note that in the example of FIG. 8, the indirect view is somewhat looking down upon the user 820, and in the example of FIG. 10, the indirect view (s) are somewhat looking to the side of the user 820, compared to the direct view; and the depth difference represented by a difference between the real depth of, for example, the occluded surface 860 and the measured depth being the sum of the distance 875 and the distance 876. Based on these calculations, the processor 1140 corrects the measured depth of the surface 860 by subtracting the additional path length caused by viewing the surface 860 via the mirror 880 so as to establish a corrected three-dimensional location of the surface 860.

The system can also obtain the camera-to-mirror distance 875 from a LIDAR or similar range detection of a non-reflective or marker portion of the mirror arrangement.

Figure 12:
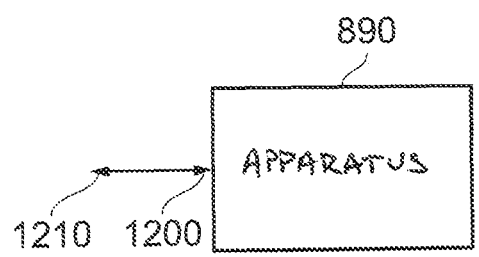
FIGS. 12 and 13 schematically represent mirror arrangements.
Figure 13:
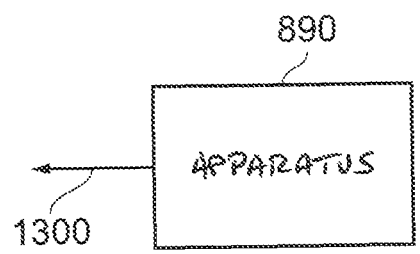

FIGS. 12 and 13 schematically represent aspects of the mirror arrangements. In FIG. 12, the apparatus 890 is configured both to receive (as indicated by the incoming arrow head 1200) information indicating actuator operations to vary the configuration of the mirror 880 and to provide, as indicated by the arrowhead 1210, information to the processor 1140 to allow the calculations discussed above to be performed.

In FIG. 13, the apparatus 890 simply indicates 1300 to the processor 1140 the current position and/or orientation of the associated mirror 880. This allows the mirror 880 to be positioned manually by a user and to report back on its current position and/or orientation to the processor 1140.

Figure 14:
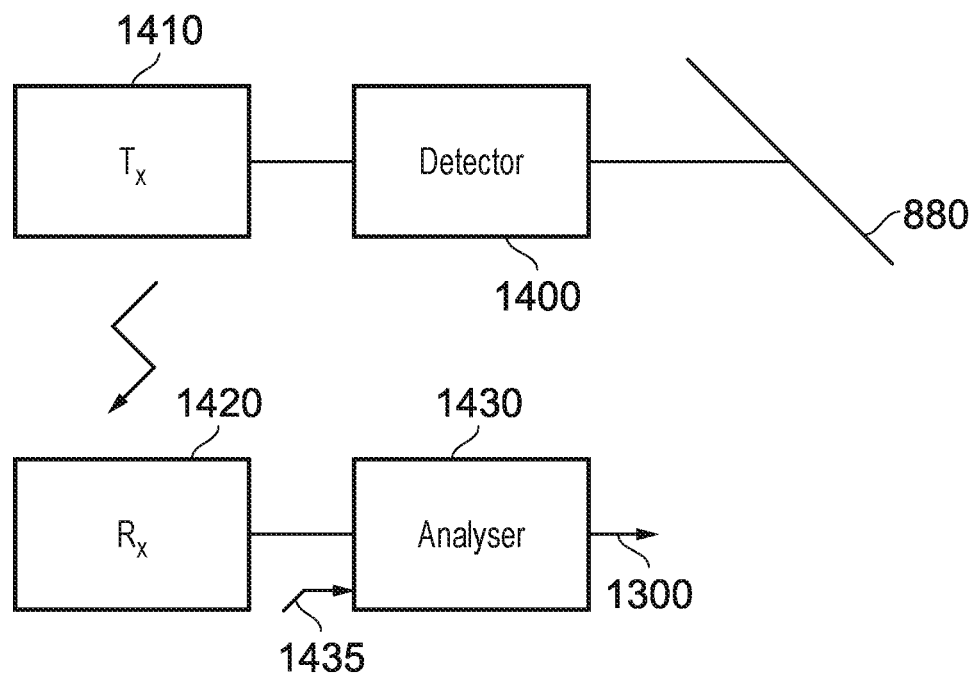
FIG. 14 schematically represents an example mirror arrangement and FIG. 15 is a schematic flowchart representing method steps associated with that arrangement.

An example of the latter arrangement (FIG. 13) is shown schematically in FIG. 14, in which a detector 1400 detects the current position and/or orientation of the mirror 880, for example relative to the camera 850. This can be performed using techniques associated with computing game controllers such as the Sony Move (RTM) controller, in which accelerometers and optical markers are associated with the detector 1400 so as to communicate by virtue of detected accelerations (which can then be integrated) changes in position of the mirror 880 and to communicate by the optimal marker a location relative to the camera 850 (given that the optimal marker can be observed by the camera 850 in terms of its image location and size). The detections by the detector 1400 are transmitted by a data transmitter such as a wireless data transmitter 1410 to a data receiver 1420 and from there to an analyser 1430 so as to provide the indications 1300 to the processor 1140.

Figure 15:
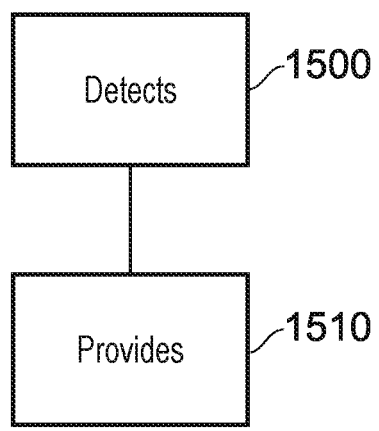

Referring to schematic flowchart in FIG. 15, at a step 1500, the apparatus 890 detects the current position and/or orientation of the mirror 880 and at a step 1510 provides this information, for example by the wireless link formed by the transmitter 1410 and the receiver 1420, to the processor 1140. Note that some of the detection functionality may in fact be provided by the analyser 1430, which may in some examples receive image data 1435 from the camera 850 to allow the image location and size of an optimal marker to be detected, and some of the functionality of the step 1500 can be provided by the detector 1400.

Figure 16:
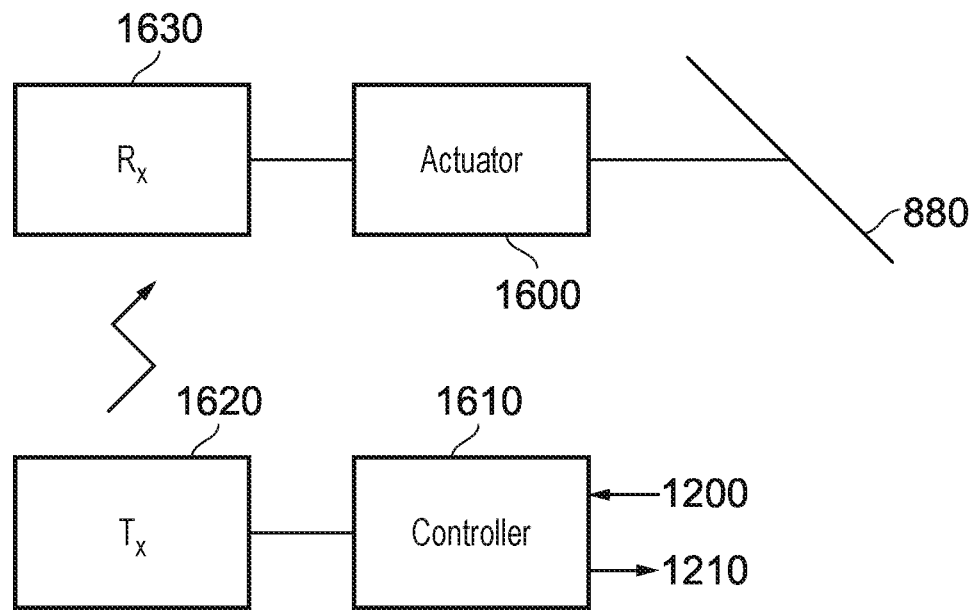
FIG. 16 schematically represents another example mirror arrangement and FIG. 17 is a schematic flowchart representing method steps associated with that arrangement.

The alternative arrangement of FIG. 12 is shown in more detail in FIG. 16, in which the current position and/or orientation of the mirror 880 is controlled by an actuator 1600 under the control of control signals generated by a controller 1610 and provided to the actuator by a wireless data path comprising a transmitter 1620 and a receiver 1630.

FIG. 16 therefore provides an example of a mirror actuator 1600 configured to move the mirror; and a controller 1610 configured to control a position and/or orientation of the mirror using the mirror actuator. The controller may be configured to adjust the position and/or orientation of the mirror so as to provide the camera with two or more different views of the scene. In particular, the controller may be configured as discussed below to adjust a position and/or orientation of the mirror, in response to determining that a feature of interest (such as an occluded surface) is not be present in images captured by the camera.

The controller 1610 generates a required position and/or orientation of the mirror 880 in response to signals 1200 and also output signals 1210 indicating a current controlled position and/or orientation of the mirror 880.

The control in this way of the mirror configuration can be useful in example arrangements in which the mirror configuration is potentially changed to ensure that an appropriate view of an object of interest (such as the user 820 in the drawings discussed above) is available. Such an arrangement is shown in the schematic flowchart of FIG. 17.

Figure 17:
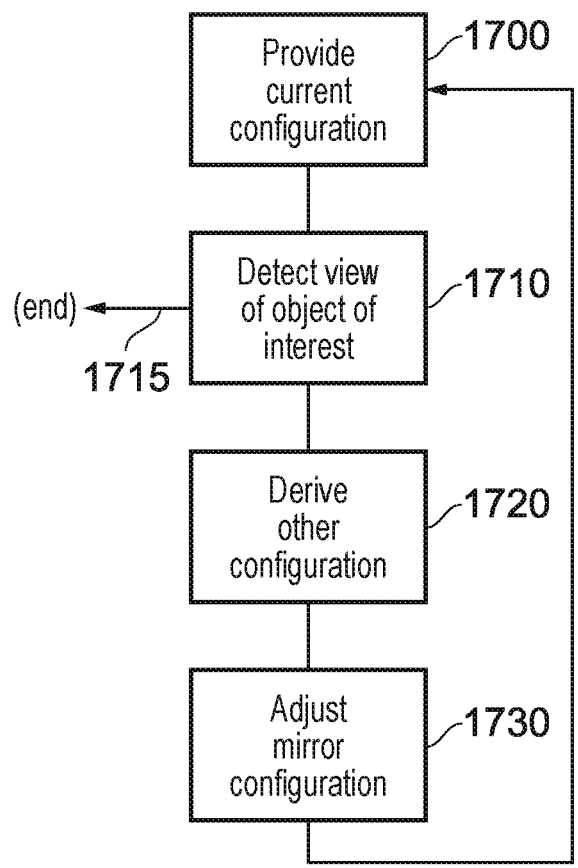

Referring to FIG. 17, the apparatus 890 provides a current configuration of the mirror 880 to the processor 1140 at a step 1700. The processor 1140 detects, at a step 1710 whether this configuration provides a view of the occluded side of the object of interest. This detection can be carried out analytically from the angle and distance and spatial location of the mirror relative to the camera 850 and/or by actually detecting image content at the appropriate depth in the image 1120 coupled with the depth representation 1130.

If an adequate view is provided of the occluded surface then the process can end 1715. Otherwise, at a step 1720 the processor 1140 derives another configuration of the mirror 880 and provides this as data 1200 to the apparatus 890 which then, at a step 1730, adjusts the mirror configuration to the one indicated the data 1200 before control returns to the step 1700.

Figure 18:
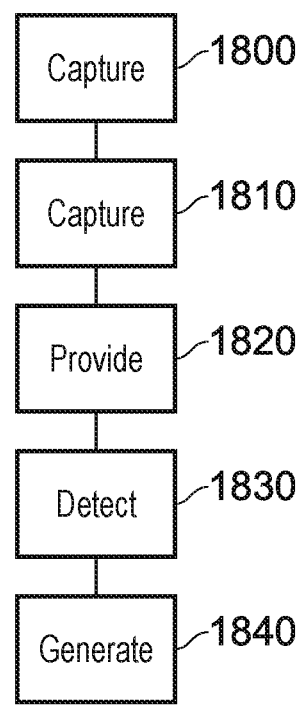
FIG. 18 is a schematic flowchart illustrating a method.

By way of summary, FIG. 18 is a schematic flowchart illustrating a method comprising:

capturing (at a step 1800) images of a user in a scene;

capturing (at a step 1810) depth representations of the scene, including emitting a non-visible signal;

providing (at a step 1820) a mirror arranged to reflect at least some of the non-visible signal emitted by the emitter to one or more features within the scene (such as a rear surface of the user) that would otherwise be occluded by the user and to reflect light from the one or more features for the step of capturing images;

detecting (at a step 1830) a position and orientation of the mirror; and generating (at a step 1840) a three-dimensional representation of the scene in dependence on the captured images and depth representations and the detected pose of the mirror.

Figure 19:
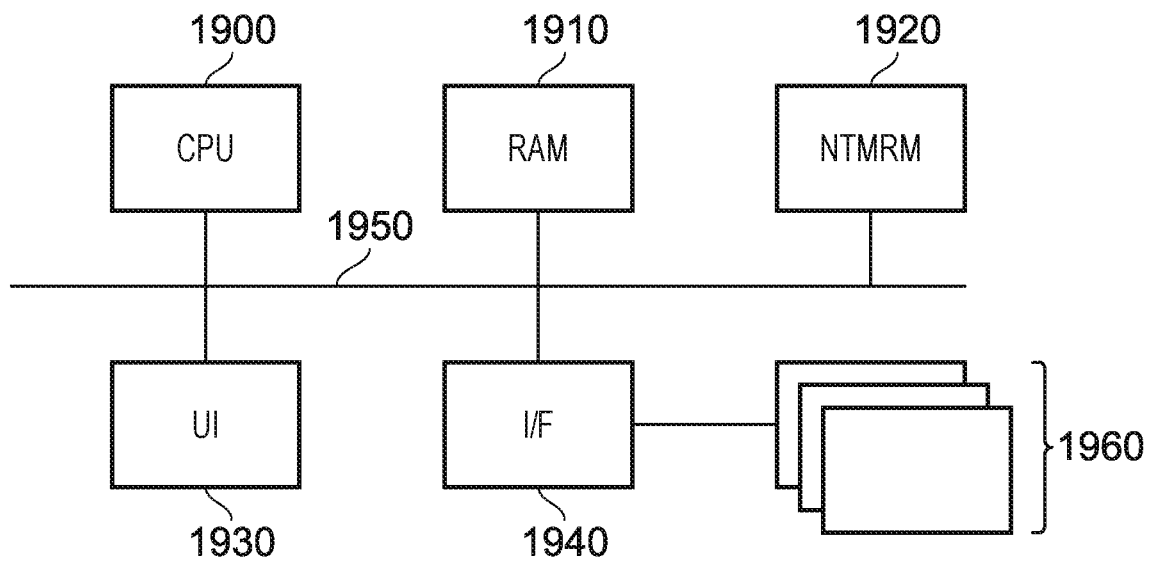
FIG. 19 schematically illustrates a data processing apparatus.

FIG. 19 schematically illustrates a data processing apparatus suitable to carry out the methods discussed above and in particular to implement one or both of the auto-encoder and the classification system, comprising a central processing unit or CPU 1900, a random access memory (RAM) 1910, a non-transitory machine-readable memory or medium (NTMRM) 1920 such as a flash memory, a hard disc drive or the like, a user interface such as a display, keyboard, mouse, or the like 1930, and an input/output interface 1940 linked to peripherals 1960 such as a camera, a depth detector and a mirror arrangement. These components are linked together by a bus structure 1950. The CPU 1900 can perform any of the above methods under the control of program instructions stored in the RAM 1910 and/or the NTMRM 1920. The NTMRM 1920 therefore provides an example of a non-transitory machine-readable medium which stores computer software by which the CPU 1900 perform the method or methods discussed above.

Figure 20:
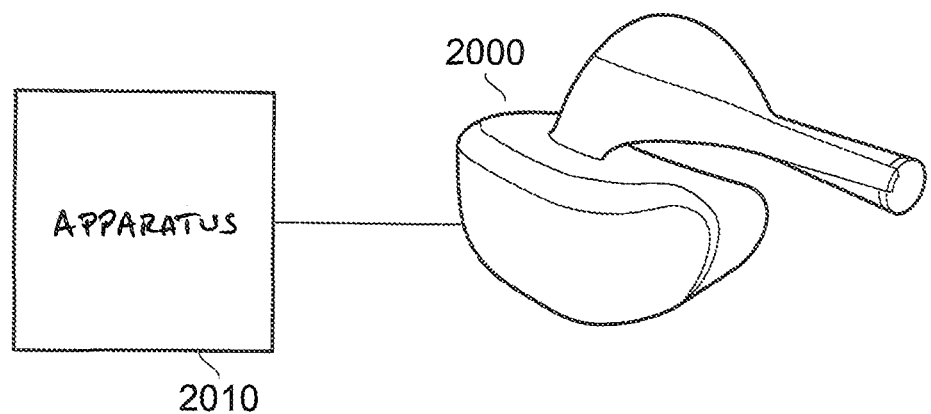
FIG. 20 schematically illustrates a display arrangement.

The resulting scene may be viewed using a display arrangement having screen or a head mountable display 2000 (FIG. 20), for example, each providing an example of a free viewpoint viewing arrangement to view the three-dimensional representation of the scene as generated by apparatus 2010 using the techniques discussed above.

Figure 21:
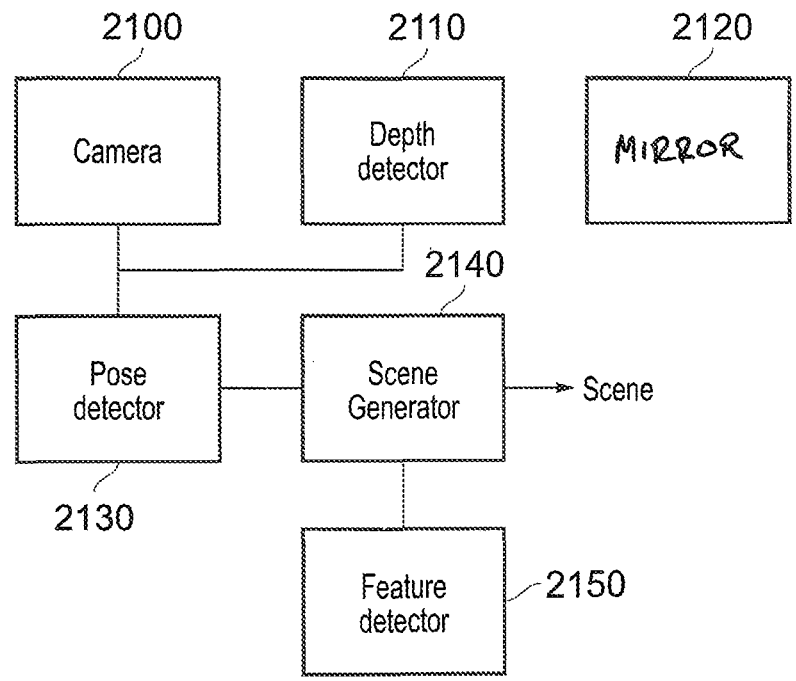
FIG. 21 schematically illustrates an apparatus.

FIG. 21 schematically illustrates apparatus using such techniques, comprising:

a camera 2100 configured to capture images of a user in a scene;

a depth detector 2110 configured to capture depth representations of the scene, the depth detector comprising an emitter configured to emit an non-visible signal;

a mirror 2120 arranged to reflect at least some of the non-visible signal emitted by the emitter to one or more features within the scene that would otherwise be occluded by the user and to reflect light from the one or more features to the camera;

a pose detector 2130 configured to detect a position and orientation of the mirror relative to at least one of the camera and the depth detector; and a scene generator 2140 configured to generate a three-dimensional representation of the scene in dependence on the images captured by the camera and the depth representations captured by the depth detector and the pose of the mirror detected by the pose detector.

The apparatus may work in conjunction with a feature detector 2150 configured to detect a feature of interest in the scene, such as an occluded surface or other occluded object. The feature detector may be configured to detect whether the feature of interest is present in images captured by the camera. The feature detector may be configured to detect an object of interest and to detect, as the feature of interest, a surface of the object of interest at least partly occluded from a direct view of the camera.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. Apparatus comprising:
   a camera configured to capture images of a user in a scene;
   a depth detector configured to capture depth representations of the scene, the depth detector comprising an emitter configured to emit a non-visible signal;
   a mirror arranged to reflect at least some of the non-visible signal emitted by the emitter to one or more features within the scene that would otherwise be occluded by the user and to reflect light from the one or more features to the camera;
   a pose detector configured to detect a position and orientation of the mirror relative to at least one of the camera and the depth detector;
   a scene generator configured to generate a three-dimensional representation of the scene in dependence on the images captured by the camera and the depth representations captured by the depth detector and the pose of the mirror detected by the pose detector;
   a mirror actuator configured to move the mirror;
   a controller configured to control a position and/or orientation of the mirror using the mirror actuator; and
   a feature detector configured to detect a feature of interest in the scene, and to detect whether the feature of interest is present in images captured by the camera,
   wherein the controller is configured to adjust a position and/or orientation of the mirror, in response to determining that the feature of interest is not present in images captured by the camera.

2. Apparatus according to claim 1, in which the controller is configured to adjust the position and/or orientation of the mirror so as to provide the camera with two or more different views of the scene.

3. Apparatus according to claim 1, in which the feature detector is configured to detect an object of interest and to detect, as the feature of interest, a surface of the object of interest at least partly occluded from a direct view of the camera.

4. Apparatus according to claim 1, comprising: two or more mirrors, each having an associated pose detector.

5. Apparatus according to claim 1, in which the camera and at least a non-visible emitter of the depth detector are substantially co-sited.

6. Apparatus according to claim 1, comprising a free viewpoint viewing arrangement to view the three-dimensional representation of the scene.

7. A method comprising:
   capturing images of a user in a scene;
   capturing depth representations of the scene, including emitting a non-visible signal;
   providing a mirror arranged to reflect at least some of the non-visible signal emitted by the emitter to one or more features within the scene that would otherwise be occluded by the user and to reflect light from the one or more features for the step of capturing images;
   detecting a position and orientation of the mirror;
   generating a three-dimensional representation of the scene in dependence on the captured images and depth representations and the detected pose of the mirror;
   moving the mirror in response to control signals to control a position and/or orientation of the mirror; and
   detecting a feature of interest in the scene, and whether the feature of interest is present in images captured by the camera,
   wherein the moving includes adjusting a position and/or orientation of the mirror, in response to determining that the feature of interest is not present in images captured by the camera.

8. A non-transitory machine-readable storage medium which stores computer software which, when executed by a computer, causes the computer to perform a method for:
   capturing images of a user in a scene;
   capturing depth representations of the scene, including emitting a non-visible signal;
   providing a mirror arranged to reflect at least some of the non-visible signal emitted by the emitter to one or more features within the scene that would otherwise be occluded by the user and to reflect light from the one or more features for the step of capturing images;
   detecting a position and orientation of the mirror;
   generating a three-dimensional representation of the scene in dependence on the captured images and depth representations and the detected pose of the mirror;
   moving the mirror in response to control signals to control a position and/or orientation of the mirror; and
   detecting a feature of interest in the scene, and whether the feature of interest is present in images captured by the camera,
   wherein the moving includes adjusting a position and/or orientation of the mirror, in response to determining that the feature of interest is not present in images captured by the camera.

* * * * *